Nov. 1, 1927.  1,647,522
J. G. HOFFER ET AL
SEAT CONSTRUCTION
Filed Oct. 7, 1926    4 Sheets-Sheet 1

INVENTORS
JOSEPH. H. BOURGON
PERRY W. SULLIVAN
JOSEPH G. HOFFER
BY
ATTORNEY

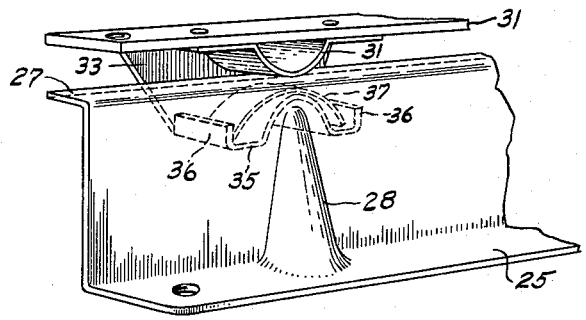
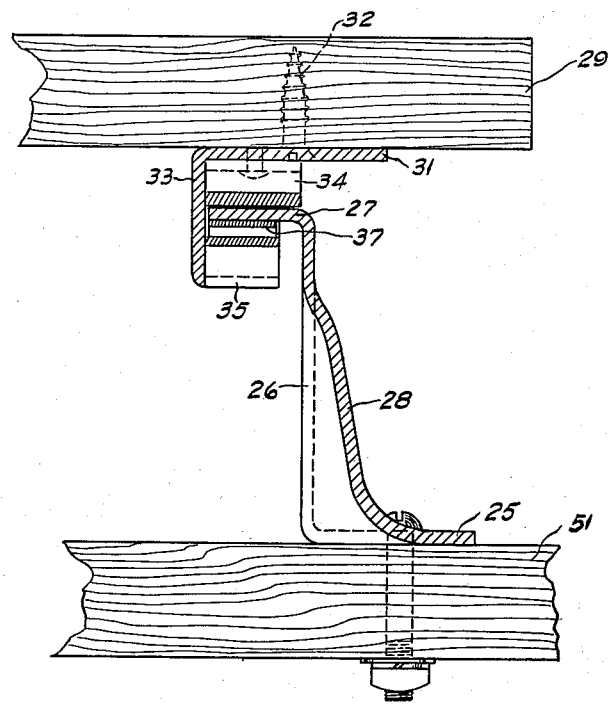

Nov. 1, 1927.
J. G. HOFFER ET AL
SEAT CONSTRUCTION
Filed Oct. 7, 1926
1,647,522
4 Sheets-Sheet 3
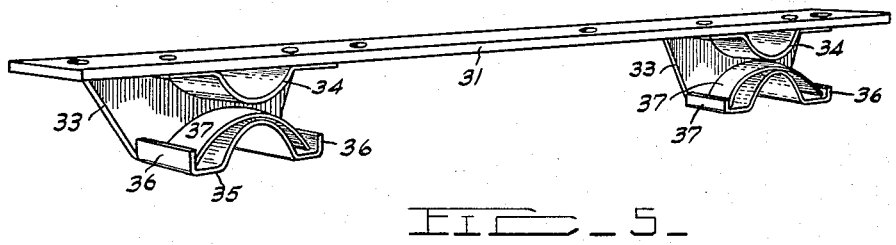
FIG_5_
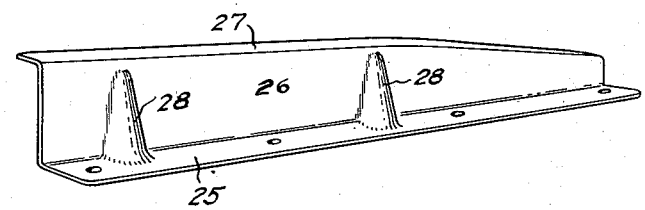
FIG_6_
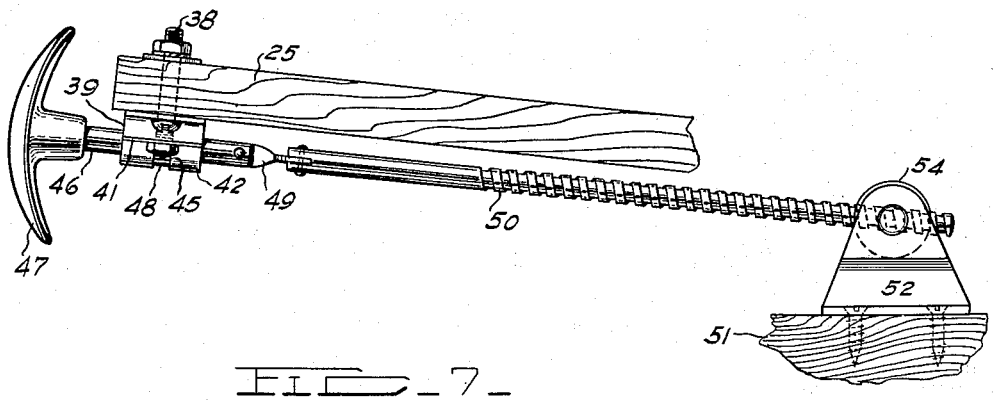
FIG_7_
INVENTORS
JOSEPH H. BOURGON
PERRY W. SULLIVAN
JOSEPH G. HOFFER
BY
ATTORNEY Nov. 1, 1927.  
J. G. HOFFER ET AL  
1,647,522

SEAT CONSTRUCTION

Filed Oct. 7, 1926     4 Sheets-Sheet 4

INVENTORS  
JOSEPH H. BOURGON  
PERRY W. SULLIVAN  
JOSEPH G. HOFFER  
BY  
ATTORNEY

Patented Nov. 1, 1927.

1,647,522

UNITED STATES PATENT OFFICE.

JOSEPH G. HOFFER, PERRY W. SULLIVAN, AND JOSEPH H. BOURGON, OF DETROIT, MICHIGAN, ASSIGNORS TO THE STUDEBAKER CORPORATION, OF DETROIT, MICHIGAN, A CORPORATION OF NEW JERSEY.

SEAT CONSTRUCTION.

Application filed October 7, 1926. Serial No. 140,016.

This invention relates to adjustable seats and particularly to a design which is adaptable for use in connection with the bodies of motor vehicles, the principal object being to provide a seat which is adjustable forwardly and rearwardly.

Another object is to provide a seat particularly applicable for use as a driver's seat in a motor vehicle, such seat being adjustable forwardly and rearwardly by means of a screw operated by a conveniently located handle.

A further object is to provide a seat slidably supported on a pair of track-like brackets disposed longitudinally thereof, and further provided with a screw rotatably secured against relative axial movement to the bottom thereof, the screw being threadably received in a pivoted nut supported on the floor, whereby when the screw is rotated the seat is caused to move bodily forwardly or rearwardly on said brackets.

The above being among the objects of the present invention, the same consists of certain features of construction and combinations of parts to be hereinafter described with reference to the accompanying drawings, and then claimed, having the above and other objects in view.

In the accompanying drawings which illustrate a suitable embodiment of the present invention, and in which like numerals refer to like parts throughout the several different views, Figure 1 is a side view of a seat constructed in accordance with the present invention, shown in connection with a fragment of a floor.

Figure 3 is a fragmentary perspective view showing the manner in which the brackets secured to the under side of the seat frame co-operate with the supporting tracks or brackets.

Figure 4 is a transverse sectional view taken centrally through the parts shown in Figure 3, showing a fragment of the seat frame and floor in connection therewith.

Figure 5 is a perspective view of one of the complete bracket members adapted to be secured to the under side of the seat.

Figure 6 is a perspective view of one of the track or supporting bracket members.

Figure 7 is a side view of the mechanism employed for moving the seat forwardly or rearwardly, a fragment of the seat frame and floor being shown in section therewith.

Figure 1:
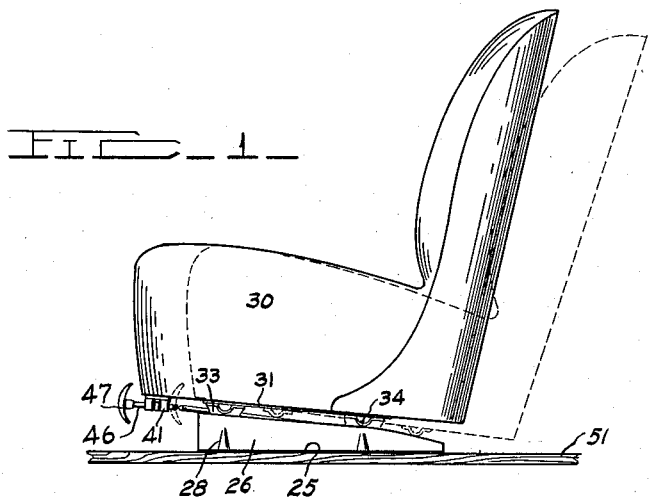
Figure 2:
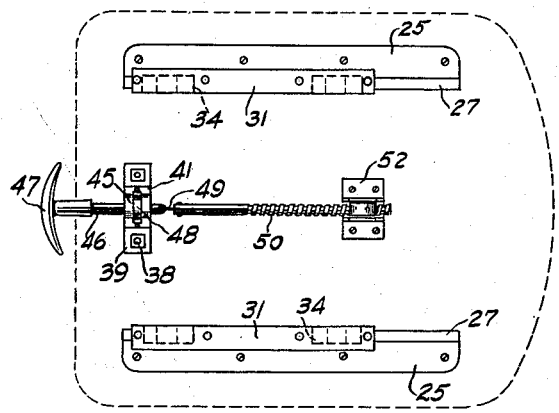
Figure 2 is a plan view of the parts necessary for the adjustment of the seat shown in Figure 1 illustrating the relative positions they assume in connection with the seat, the outline of the base of the seat being shown in dotted lines.
Figure 8:
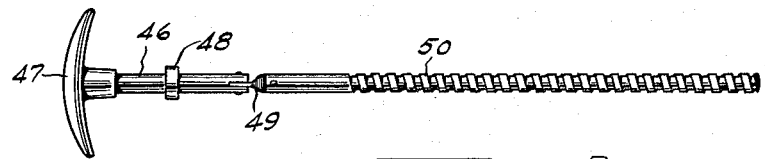
Figure 8 is a side view of the screw and its operating handle used in connection with the seat moving mechanism shown in Figure 7.

In many places where seats of the conventional fixed type are used, it would aid the comfort and convenience of the occupant thereof if the seat could be shifted a limited amount forwardly or rearwardly, this being particularly true in respect to the driver's seat of a motor vehicle. Such driver's seat is usually immovable and made to fit the average size driver, so that a person not of the average size finds the seat uncomfortable. The present invention provides an adjustable seat which may be easily and quickly adjusted forwardly or rearwardly of its mid-position, and in the event the same is used as a driver's seat in a motor vehicle, the seat may be adjusted toward or away from the controlling devices an amount sufficient to position the driver at the most comfortable and advantageous position in relation thereto.

The seat as shown in the present invention is supported on a pair of track-like brackets and a screw is provided for moving the seat as a unit along such brackets. Each bracket is preferably formed of sheet metal and comprises a horizontal inwardly turned flange 25 forming the base thereof, a vertical web portion 26 of a suitable height for the seat, and a horizontal track or flange portion 27 formed by turning outwardly the upper margin of the web 26. A plurality of projections 28 may be formed in the web portion 26 to give added strength thereto. The web 26 is preferably of greater depth at the front than at the rear so that when the seat is moved forwardly its position relative to the floor is slightly increased, and when moved rearwardly is slightly decreased.

To the frame 29 of the seat bottom 30 are secured co-operating slides for the tracks 27, each slide comprising a flat sheet metal base member 31 secured to the under face of the seat frame side members 29 by screws 32. Two downwardly extending flanges 33 are formed on each base member 31, and in line with each flange 33 a sheet metal part 34 having a downwardly disposed convex surface extending transversely of the base member is secured thereto. A part 35, similar in shape but provided with upwardly disposed end flanges 36, is secured along one edge, preferably by welding, to the lower portion of each flange 33 with its convex surface disposed upwardly in line with the convex surface of the part 34 and spaced therefrom a distance slightly greater than the thickness of the track 27. A curved spring 37 made from flat stock and having a radius greater than the convex surface of the part 35 is placed between the convex surfaces of the parts 34 and 35 with its ends adjacent to the flanges 36 which hold it against end movement. The track portion 27, when operatively associated with the slides on the bottom of the seat, is received between the convex portion of the part 34 and the upper surface of the spring 37, the convex portion of the part 34 forming an easily slidable and non-binding seat, and the spring 37 holding such seat down on the track 27 and preventing the same from rattling. The relationship of these parts in operative position is clearly shown in Figures 3 and 4.

Figures 9, 10:
Figure 9 is a perspective view of the bracket member for rotatably supporting the screw against axial movement on the seat frame.
Figure 10 is a perspective view of the swiveled nut and bracket which is secured to the floor and which threadably receives the screw.

The means for adjusting the seat on the supporting members just described will now be described. A bracket 39 is secured to the forward edge of the seat frame 29 by bolts 38, said bracket having a semi-cylindrical seat portion 40 (see Figure 9) and a cap 41 provided wih a complementary seat portion 42 secured thereto by screws 43, the complementary seat portions forming a substantially cylindrical opening 44 therebetween extending longitudinally of the seat. Each seat portion 40 and 42 is provided with a central transverse slot 45. Journaled in the opening 44 is a shaft 46 provided with a handle 47 positioned just forwardly of the front edge of the seat 30. The shaft 46 is also provided with a relatively non-movable collar 48 midway its length, the collar 48 being received within the slots 45 of the bracket 39 and cap 41 to thereby prevent axial movement of the shaft 46 relative thereto but not interfering with rotational movement thereof.

The rear end of the shaft 46 is pivotally secured in one plane to a small link 49 which in turn is pivotally secured in a plane ninety degrees thereto to the forward end of a rearwardly extending screw shaft 50, the shaft 50 thus being connected to the shaft 46 by a universal connection. Secured to the floor 51 at a point midway between the seat supporting brackets and rearwardly of their center is a bracket 52 provided with a longitudinally extending slot 53 within which is pivotally supported about a transverse axis a block 54 having a threaded opening 55 (see Figure 10) extending therethrough longitudinally of the seat for receiving the screw shaft 50. As the bracket 52 and block 54 are secured relatively stationary in respect to the floor 51, the handle 47 may be turned to rotate the screw 50 so that it will move forwardly or rearwardly through the block 54 depending upon the direction in which the handle 47 is turned, and at the same time the handle 47 and shaft 46 being operatively connected to the screw 50, are caused to have a like movement. Inasmuch as the bracket 39 and cap 41 are rotatably secured to the shaft 46 against axial movement, and are also secured to the frame 25 of the seat bottom 30, when the shaft 46 is moved forwardly or rearwardly upon rotation of the handle 47, the seat bottom 30 is likewise moved forwardly or rearwardly a like amount. This provides a simple means for adjusting the seat forwardly or rearwardly to best suit the position of the same for the particular person occupying the seat. The handle 47 is positioned just forwardly of the forward edge of the seat to provide a readily accessible means for adjusting the seat with a minimum of exertion.

Figure 11:
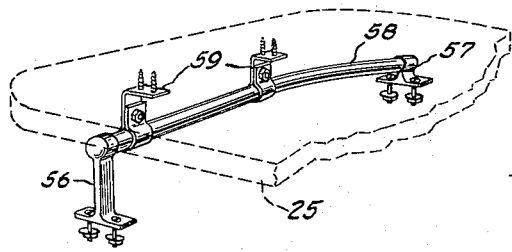
Figure 11 is a perspective view of a modified form of track or supporting bracket.

In Figure 11 is shown a slightly modified form of seat-supporting bracket. In this modification two end brackets 56 and 57 are provided with socket ends which receive a tubular member 58 therebetween which forms a supporting runway or track for the encircling strap metal sliding brackets 59 which are secured to the under side of the seat bottom frame 25.

Figure 12:
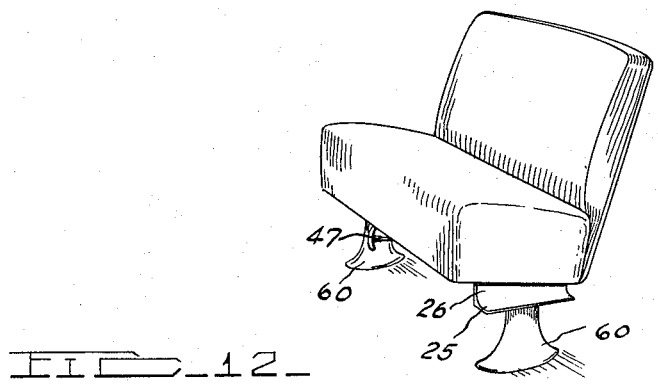
Figure 12 is a perspective view showing how the supporting bracket may be constructed when a relatively high seat is desired.

In Figure 12 are shown a seat and adjusting mechanism such as are shown in the preceding views, mounted on standards 60 to raise the seat farther from the floor than the constructions shown in the previous views, such higher seats being preferable in certain types of passenger-carrying vehicles.

Formal changes may be made in the specific embodiment of the invention shown without departing from the spirit and substance of the broad invention, the scope of which is commensurate with the appended claims.

What we claim is:—

1. Means for supporting a seat comprising a pair of sheet metal supports each provided with a vertical web portion and an upper marginal flange forming a track, brackets secured to said seat and each comprising a pair of opposed convex-surfaced members spaced apart to slidably receive said flange therebetween, and spring means for resiliently holding one of said members in contact with said flange.

2. Means for adjustably supporting a seat comprising a pair of Z-sectioned sheet metal supporting track members decreasing in height from front to rear along a curved line and provided with upper marginal flanges, brackets secured to the frame of said seat and having line contact with said flanges, and a manually operable rotatable screw secured against axial movement relative to said seat threadably engaging a pivoted block secured against movement longitudinally of said track members whereby said seat may be adjusted in position longitudinally of said track members and assume a lowered position when adjusted to its rearward position.

3. Means for supporting a seat comprising a pair of sheet metal supports, each provided with a vertical web portion, a lower horizontal flange adapted to be secured to the floor, and an upper marginal flange forming a track, said track being curved in elevation and being lower at the rear end thereof than at the front end thereof, brackets secured to said seat having line contact with said track, means for resiliently holding said brackets in contact with said track, a rotatable handle secured against axial movement to said seat, a screw block, mounted to swing about a horizontal line transversely of said seat, secured to said floor, a screw threadably engaging said block, and a link pivotally secured to said handle to swing in one plane and pivotally secured to said screw to swing in a plane 90° from the first mentioned plane.

Signed by us at Detroit, Michigan, U. S. A., this 4th day of October, 1926.

JOSEPH G. HOFFER.
PERRY W. SULLIVAN.
JOSEPH H. BOURGON.